US010484449B2

(12) United States Patent
Christianto et al.

(10) Patent No.: US 10,484,449 B2
(45) Date of Patent: *Nov. 19, 2019

(54) EMAIL WEBCLIENT NOTIFICATION QUEUING

(71) Applicant: Amazon Technologies, Inc., Reno, NV (US)

(72) Inventors: Daniel Christianto, Seattle, WA (US); Ivo van Doorn, The Hague (NL); Simon Arthur Koster, Rotterdam (NL)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,137

(22) Filed: Feb. 15, 2018

(65) Prior Publication Data
US 2018/0241800 A1 Aug. 23, 2018

Related U.S. Application Data

(63) Continuation of application No. 14/035,355, filed on Sep. 24, 2013, now Pat. No. 9,900,366, which is a
(Continued)

(51) Int. Cl.
G06F 15/16 (2006.01)
H04L 29/08 (2006.01)
H04L 12/58 (2006.01)

(52) U.S. Cl.
CPC .............. H04L 67/02 (2013.01); H04L 51/08 (2013.01); H04L 51/24 (2013.01); H04L 67/141 (2013.01)

(58) Field of Classification Search
CPC ......... H04L 67/02; H04L 51/24; H04L 51/08; H04L 67/141
See application file for complete search history.

(56) References Cited

U.S. PATENT DOCUMENTS 6,052,730 A 4/2000 Felciano et al.
6,138,158 A 10/2000 Boyle et al.
(Continued)

FOREIGN PATENT DOCUMENTS

CN 1233898 A 11/1999
EP 0954146 A2 11/1999
(Continued)

OTHER PUBLICATIONS

International Patent Application No. PCT/US2014/055963; Int'l Preliminary Report on Patentability; dated Mar. 31, 2016; 7 pages.
(Continued)

Primary Examiner — John B Walsh
(74) Attorney, Agent, or Firm — BakerHostetler

(57) ABSTRACT

Notifications received from an email server can be stored and provided to a webclient upon subsequent communications from the webclient received at an HTTP server. Notifications stored in a database or a storage are retrieved and transmitted to the webclient by backup or alternate HTTP servers when the webclient requests service. An attachment received from a webclient for a message in composition can be saved by an HTTP server in a storage system so that a backup HTTP server can locate the attachment and provide the attachment to a messaging server when the user is ready to send the message.

20 Claims, 10 Drawing Sheets

Related U.S. Application Data continuation-in-part of application No. 14/029,113, filed on Sep. 17, 2013, now Pat. No. 9,961,027.

(56) References Cited

U.S. PATENT DOCUMENTS

| | | |
|---|---|---|
| 6,412,009 B1 | 6/2002 | Erickson et al. |
| 6,654,786 B1 | 11/2003 | Fox et al. |
| 6,789,119 B1 | 9/2004 | Zhu et al. |
| 6,965,917 B1 | 11/2005 | Aloni et al. |
| 7,577,749 B1 | 8/2009 | Long |
| 7,895,271 B1 | 2/2011 | Malik |
| 2003/0154277 A1 | 8/2003 | Haddad et al. |
| 2004/0186894 A1 | 9/2004 | Jhingan et al. |
| 2005/0144278 A1 | 6/2005 | Atamaniouk |
| 2005/0198379 A1 | 9/2005 | Panasyuk et al. |
| 2007/0203995 A1 | 8/2007 | Wang et al. |
| 2007/0299918 A1 | 12/2007 | Roberts |
| 2008/0065761 A1 | 3/2008 | Wilson |
| 2009/0138792 A1 | 5/2009 | Cudich et al. |
| 2010/0058123 A1 | 3/2010 | Yamashirodani et al. |
| 2010/0088387 A1 | 4/2010 | Calamera |
| 2010/0125504 A1 | 5/2010 | Agha |
| 2010/0211626 A1 | 8/2010 | Li |
| 2010/0274922 A1 | 10/2010 | Reavely |
| 2012/0059895 A1 | 3/2012 | Gardner et al. |
| 2012/0331047 A1 | 12/2012 | Sana et al. |
| 2013/0067086 A1 | 3/2013 | Hershko et al. |
| 2013/0242336 A1 | 9/2013 | Koshigaya |
| 2013/0318176 A1 | 11/2013 | Claux et al. |
| 2015/0339285 A1 | 11/2015 | Safaei et al. |
| 2016/0050177 A1 | 2/2016 | Cue et al. |

FOREIGN PATENT DOCUMENTS

| | | |
|---|---|---|
| EP | 2055059 B1 | 10/2012 |
| JP | 2013-074452 A | 4/2013 |
| WO | WO 2013/109550 A1 | 7/2013 |

OTHER PUBLICATIONS

Singapore Patent Application No. 11201601935X; Written Opinion and Search Report; dated Jul. 25, 2016; 9 pages.

Singapore Patent Application No. 11201601935X; Written Opinion; dated Apr. 12, 2017; 6 pages.

Fielding et al.; "Hypertext Protocol (HTTP/1.1): Message Syntax and Routing draft-ietf-httpis-p1-messaging-23"; HTTPbis Working Group Internet Draft; Jul. 2013; 84 pages.

European Patent Application No. 14845802.9; Extended Search Report; dated Oct. 5, 2017; 16 pages.

EMAIL WEBCLIENT NOTIFICATION QUEUING

CROSS-REFERENCE TO RELATED APPLICATION

This application is a continuation of, and claims priority to, U.S. patent application Ser. No. 14/035,355, filed Sep. 24, 2013 and entitled "EMAIL WEBCLIENT NOTIFICATION QUEUING", which is a continuation-in-part of, and claims priority to, U.S. patent application Ser. No. 14/029,113, filed Sep. 17, 2013 and entitled "EMAIL WEBCLIENT AUTOMATIC FAILOVER", which is incorporated by reference herein in its entirety.

BACKGROUND

Many services offered via the Internet, such as services provided by email service providers, provide a web interface ("webclient") that allows users to interact with a server, such as a mail server, using a web browser. User connectivity to mail servers is facilitated by one or more web servers (typically Hypertext Transfer Protocol (HTTP) servers) that retrieve data in response to user web page requests. Mail servers and web servers are typically located in a data center or some other facility remote from the user. Redundancy is usually built into such systems, with redundant servers providing service in the event of a failure of a primary server and redundant communications links connected to the Internet to provide service in the event of a failure of one or more communications links.

Webclients do not maintain persistent connections (e.g., transmission control protocol (TCP) connections) to HTTP servers or to other servers with which a webclient is interacting via an HTTP server. Because of this, a notification (e.g., a new email notification) sent from such a server may not be received by a webclient because the server transmits the notification upon an event that triggers the notification and does not store such notifications or confirm a connection with the webclient before sending such notifications. Once sent, the server does not retain the notification, and therefore it is not possible for the webclient to later request notifications that have been sent in the past. Thus, a user of a webclient may not receive a notification intended to alert the user of an event occurrence.

When a user composes a message using a webclient, such as an email message, data associated with the message is saved locally inside the webclient. Such data may include recipient addresses and text content. When the user sends the message or chooses to save a draft of the message, this data is sent to the mail server for saving and/or processing. In some systems, such message content is automatically saved periodically. During message composition, a user may also attach data files (e.g., images, audio files, video files, etc.) to a message, but such files are not saved in a webclient during message composition and are not sent to a mail server until the user sends the message or manually saves a draft of the message. Upon a failure of connectivity to the HTTP server servicing the webclient during message composition, the attachment data may be lost.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
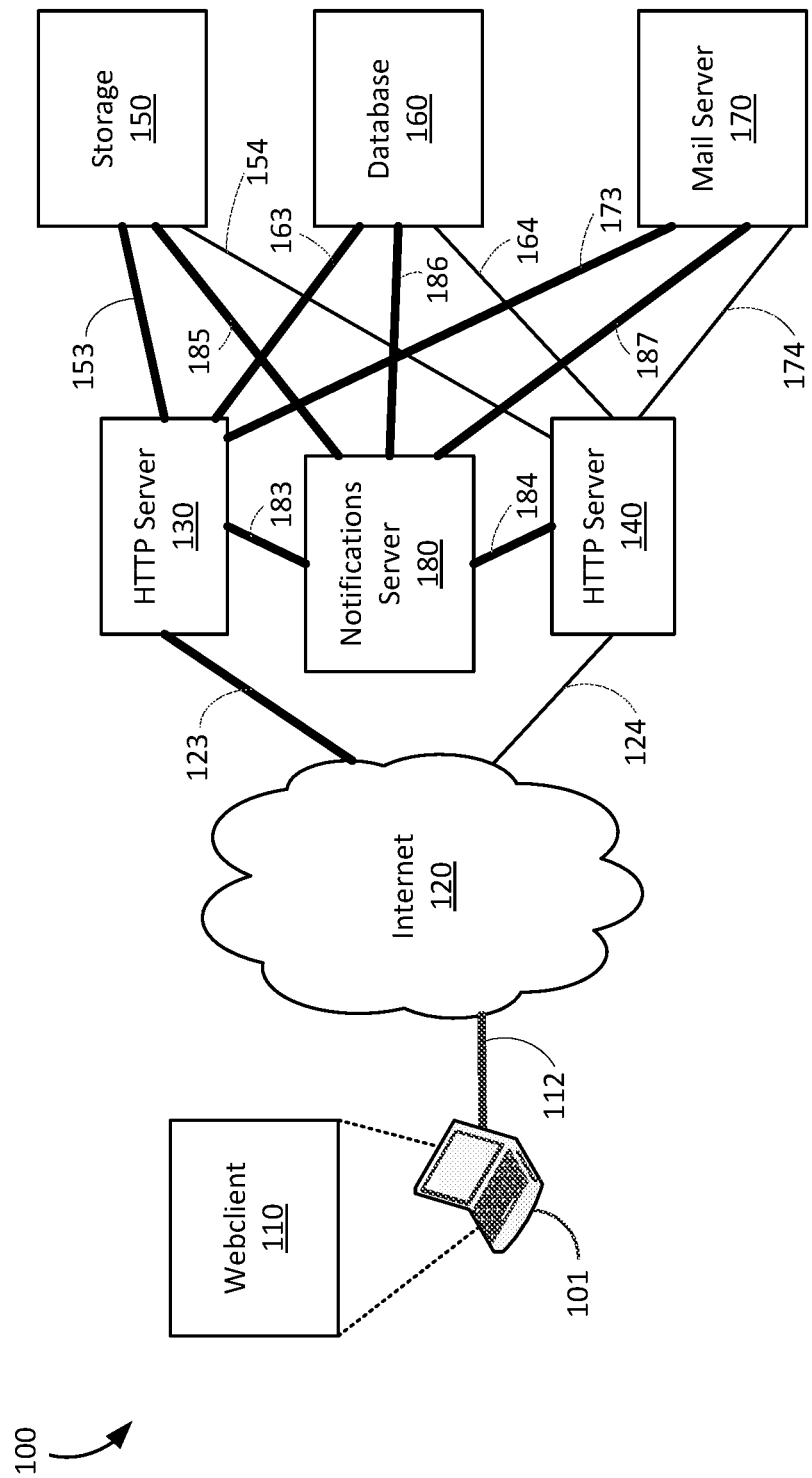
FIG. 1 illustrates an example environment in which embodiments of the invention may be implemented.

Email systems, and many social messaging websites and other interactive websites, allow user interaction that includes messaging capabilities giving users the ability to send one another messages that include attachments. Systems and methods in accordance with the various embodiments of the present disclosure provide the ability to automatically save message content such as attachments if a connection to a server (e.g., an HTTP server) is lost during the composition of the message. For example, a user may be composing an email or message using a webclient that is configured to communicate with a remote server (e.g., a mail server) via an HTTP server. While much message content may be saved by the webclient during message composition, the message may include one or more attachments that may not be capable of being saved in the webclient. If the HTTP server fails or otherwise becomes inaccessible, the attachment content may be lost because the message has not yet been saved at, or sent to, a server for delivery. In an embodiment, the HTTP server with which the webclient was initially communicating may receive attachment content while the message is being composed and copy the attachment content to a storage system. In some embodiments, state information regarding the webclient will also be saved. The HTTP server may also store metadata associated with the attachment and/or the message in a database. Upon failure of the connection to the initial HTTP server, the webclient may communicate with a backup HTTP server that retrieves the stored message attachment using the metadata associated with the email stored in the database. In this way, the user's attachment data is not lost during composition when the connection to the HTTP server is lost, but no storage space on a mail or message server is consumed saving such attachment data while the message is being composed.

Systems and methods in accordance with the various embodiments of the present disclosure also provide the ability to queue notifications that are intended for a user of a webclient. Because a webclient does not maintain a persistent connection to an email server or similar system, or to an HTTP server, a notification intended for a webclient may be missed by the webclient if it cannot be provided in response to a request from the webclient for a service or activity. In an embodiment, an HTTP server facilitating communications between a webclient and an email server or other system may maintain a persistent connection with the server or system and store notifications intended for a webclient as they are transmitted by the server or system. Alternatively such notifications may be received and stored by a notifications server accessible to an HTTP server. These notifications are then transmitted to the webclient by the HTTP server when the HTTP server receives an HTTP request from the webclient. When stored on a notifications server, the HTTP server may query or otherwise retrieve notifications when the HTTP server receives an HTTP request from the webclient. These embodiments provide a way to ensure that a webclient receives notifications without altering connection types used by the webclient and/or the server or system with which it is.

While many of the examples discussed herein are discussed in terms of email systems and mail servers, one skilled in the art will appreciate that the disclosed embodiments may be readily applied to any system where a lack of connectivity may occur during the composition of any type of message or communication that may include one or more attached files. The disclosed embodiments may also be readily applied to any system that provides notifications of any type to a webclient. All such applications are contemplated as embodiments that are within the scope of the present disclosure.

FIG. 1 illustrates non-limiting exemplary system 100 in which embodiments of the instant disclosure may be implemented. A user may be operating user device 101 that may be any type of computer, computing device, mobile device, smartphone, or any other device capable of operating a webclient. Webclient 110 may be executing on user device 101 in, for example, a web browser. Webclient 110 may be an email webclient providing an interface to an email system hosted or otherwise provided by an email service provider. User device 101 may communicate with other devices generally, and specifically with one or more email service provider devices, using Internet 120 via communications link 112. Communications link 112 may be any type and number of communications links capable of facilitating communication between two or more devices, including a wired communications link, a wireless communications link, and a combination thereof, using any protocol or other means of enabling communication between devices. Internet 120 represents any type and number of networks, and any combination thereof, that facilitate communication between devices. All such embodiments are contemplated as within the scope of the present disclosure.

Webclient 110 may be communicating with HTTP server 130 that connects to Internet 120 using communications link 123 that, like communications link 112, may be any type and number of communications links. HTTP server 130 may exchange email data with mail server 170 via communications link 173 that may also be any type and number of communications links.

While a user is composing an email using webclient 110, email data may be saved locally on user device 101 by webclient 110. However, when the user attaches an attachment to the email under composition, the attachment often cannot be saved by webclient 110. In an embodiment, when a user selects a file for attachment to the email, this attachment may be sent to HTTP server 130. HTTP server 130 may transmit a copy of the attachment to storage 150 via communications link 153. Communications link 153 may be any type and number of communications links. Storage 150 represents any type and number of data storage devices and systems, including a cloud storage system.

HTTP server 130 may transmit or generate metadata associated with the stored attachment and the email in database 160 using communications link 163. Communications link 163 may be any type and number of communications links. Database 160 represents any type and number of databases and database systems, including a cloud-based database system, as well as any number and type of memory, cache, disk drive, etc. The metadata transmitted and/or generated by HTTP server 130 may include any information that may be used by another device to associate the stored attachment with the email under composition in webclient 110, which may include storage location information that indicates where on storage 150 the attachment is saved. Alternatively, an indication that an attachment has been saved on storage 150 may be included in the metadata. Where such metadata includes an indication that an attachment has been saved rather than an indication of a particular location for the attachment, other identifying information may be used to determine the storage location of the stored attachment. For example, a combination of a webclient identifier (e.g., session identifier) and an attachment identifier (e.g., attachment name saved with a record associated with webclient 110) may be used to identify the attachment in storage 150. This metadata may also include state information regarding webclient 110, such as information indicating that webclient 110 is composing an email. Note that HTTP server 130 may store state information and update state information associated with webclient 110 periodically or as webclient 110's state changes, regardless of whether any information is being stored regarding an email attachment. All such embodiments are contemplated as within the scope of the present disclosure.

HTTP server 140 may provide redundancy to users by serving as a backup HTTP server for HTTP server 130. HTTP server 140 may connect to other devices using communications link 124, and may communicate with storage 150, database 160, and mail server 170 using communications links 154, 164, and 174, respectively. Each of communications links 124, 154, 164, and 174 may be any type and number of communications links. Note that each of communications links 124, 154, 164, and 174 is shown with less emphasis in FIG. 1 only to make clear that in FIG. 1 webclient 110 and other devices are communicating using other links rather than communications links 124, 154, 164, and 174. The various widths and emphasis of the communications links shown in the instant figures should not be understood to be an indication of any other characteristic, feature, or limitation of the illustrated communications links.

In an embodiment, HTTP server 130 may establish a persistent connection (e.g., a TCP connection) with mail server 170 via communications link 174. Such a persistent connection may be dedicated to communications associated with webclient 110. The persistent connection may be initiated upon receiving an initial request from webclient 110 for access to mail server 170 and may be maintained until a predetermined timeout expires or until an explicit closing of the persistent connection is warranted (e.g., user logs off or shuts down webclient 110). In response to the webclient's initial request, HTTP server 130 may request, on behalf of the webclient 110, email data (e.g., listing of mail in inbox, new emails, etc.) from mail server 170 and provide such data to webclient 110 upon receipt from mail server 170.

HTTP server 130 may also subscribe to notifications for webclient 110 and/or the user associated therewith from mail server 170 or otherwise request that any such notifications be provided to HTTP server 130 by mail server 170. Notifications include any notice or indication of an event that may be sent to a user, such as an indication of a newly received email, a calendar reminder, a meeting invitation, etc. Upon issuance of a notification, HTTP server 130 may store such a notification locally (e.g., memory, hard disk), and associate the notification with webclient 110, the session associated with webclient 110, and/or the user associated with webclient 110. HTTP server 130 may store subsequent notifications as they are received from mail server 170. HTTP server 130 may transmit an acknowledgement of receipt of one or more notifications to mail server 170.

HTTP server 130 may receive a subsequent request for data or a service provided by mail server 170 from webclient 110. In response to this request, HTTP server 130 may forward the request to mail server 170 and receive a response to the request from mail server 170. HTTP server may then combine any stored notifications for webclient 110 with the response received from mail server 170 and transmit the combined communication to webclient 110. Alternatively, HTTP server 130 may receive a keepalive communication or other communication from webclient 110 that does not require interaction with mail server 170. In this embodiment, HTTP server 130 may transmit any stored notifications for webclient 110 thereto. Upon transmission of stored notifications, HTTP server 130 may remove such notifications from local storage. Alternatively, webclient 110 may transmit an acknowledgement of receipt of a notification to HTTP server 130, and HTTP server may delete the notification from local storage upon receipt of this acknowledgement. Note that the notifications may be transmitted individually, in discrete communications, or in one or more communications that each may contain more than one notification. Whether transmitted individually are grouped together in some way, the communications containing one or more notifications may also contain other data, including email data intended for webclient 110. All such embodiments are contemplated as within the scope of the present disclosure.

In an embodiment, rather than, or in addition to, storing notifications locally, HTTP server 130 may store such notifications at a database or storage. For example, notifications, or indications of notifications, may be stored by HTTP server 130 at database 160 in one or more records associated with webclient 110, the communications session in use by webclient 110, or the user of webclient 110. In embodiments where one or more notifications are not stored in database 160, such notifications may be stored in a storage, such as storage 150. In such embodiments, storage location information that indicates where on storage 150 the notifications are saved may be included in a record associated with webclient 110 on database 160. Alternatively, an indication that one or more notifications have been saved on storage 150 may be included in such a record, and other identifying information may be used to determine the storage location of the stored notifications. For example, a notification identifier may be stored for each notification in the record on database 160 that is associated with webclient 110, and a combination of a webclient identifier (e.g., session identifier) and a notification identifier may be used to locate the notification in storage 150. All such embodiments are contemplated as within the scope of the present disclosure. By storing notifications at database 160 or storage 150, this information may be accessible to HTTP server 140 or other HTTP servers in the event that webclient 110 can no longer communicate with HTTP server 130 for any reason.

Where HTTP server stores notifications as database 160 and/or storage 150, HTTP server 130 transmit these notifications to webclient 110 in response to request for data or a service provided by mail server 170 or in response to a keepalive communication or other communication from webclient 110 as described herein. Upon transmission of stored notifications, HTTP server 130 may remove such notifications from database 160 and/or storage 150. Alternatively, webclient 110 may transmit an acknowledgement of receipt of a notification to HTTP server 130, and HTTP server may delete the notification from database 160 and/or storage 150 upon receipt of this acknowledgement.

Note that notifications handling, such as requesting, receiving, and subscribing to notifications, as well as storing and retrieving notifications, may be handled by a separate process within HTTP server 130 or any other HTTP server contemplated herein. For example, a first process executing on HTTP server 130 may handle communications with webclient 110 while a separate process may handle notifications. The two processes may interact in any manner in order to handle notifications and provide them to webclient 110.

In an embodiment, rather than HTTP server 130 maintain notifications, notifications server 180 may handle notifications. HTTP server 130 may communicate with notifications server 180 via link 183, which may be any type of communications link as set forth herein. HTTP server 130 may notify notifications server 180 that it is servicing webclient 110 and may provide identifying information for webclient 110, device 101, or a user thereof. Notifications server 180 may establish a persistent connection (e.g., a TCP connection) with mail server 170 via communications link 187, which may be any type of communications link as set forth herein. Such a persistent connection may be dedicated to communications associated with webclient 110. The persistent connection may be initiated upon receiving notification from HTTP server 130 that an initial request from webclient 110 for access to mail server 170 has been received, or in response to a communication generated by HTTP server 130 in response thereto. The persistent connection may be maintained until a predetermined timeout expires or until an explicit closing of the persistent connection is warranted (e.g., HTTP server 130 instructs notifications server 180 to shut it down, for example in response to user logging off or shutting down webclient 110).

Notifications server 180 may also subscribe to notifications for webclient 110 and/or the user associated therewith from mail server 170 or otherwise request that any such notifications be provided to notifications server 180 by mail server 170. Notifications include any notice or indication of an event that may be sent to a user, such as an indication of a newly received email, a calendar reminder, a meeting invitation, etc. Upon issuance of a notification, notifications server 180 may store such a notification locally (e.g., memory, hard disk), and associate the notification with webclient 110, the session associated with webclient 110, and/or the user associated with webclient 110. Notifications server 180 may store subsequent notifications as they are received from mail server 170. Notifications server 180 may transmit an acknowledgement of receipt of one or more notifications to mail server 170.

HTTP server 130 may receive a subsequent request for data or a service provided by mail server 170 from webclient 110. In response to this request, HTTP server 130 may forward the request to mail server 170 and receive a response to the request from mail server 170. HTTP server 130 may also request any pending notifications for webclient 110 from notifications server 180. Notifications server 180 may respond with notifications or with a response indicating that no notifications are pending for webclient 110. HTTP server 130 combine any notifications for webclient 110 received from notifications server 180 with the response received from mail server 170 and transmit the combined communication to webclient 110. Alternatively, HTTP server 130 may receive a keepalive communication or other communication from webclient 110 that does not require interaction with mail server 170. In this embodiment, HTTP server 130 request and receive any pending notifications for webclient 110 from notifications server 180. HTTP server 130 may transmit such notifications for webclient 110 thereto. Upon provision of notifications, notifications server 180 may remove such notifications from local storage. Alternatively, webclient 110 may transmit an acknowledgement of receipt of a notification to HTTP server 130, and HTTP server 130 may provide this acknowledgement of receipt, or another instruction generated in response to receiving an acknowledgement of receipt from webclient 110, to notifications server 180. In response, notifications server 180 may delete the notification from local storage. Note that notifications server 180 may receive and transmit notifications individually, in discrete communications, or in one or more communications that each may contain more than one notification. Whether transmitted individually are grouped together in some way, the communications containing one or more notifications may also contain other data, including any data associated with webclient 110. All such embodiments are contemplated as within the scope of the present disclosure.

In an embodiment, rather than, or in addition to, storing notifications locally, notifications server 180 may store such notifications at a database or storage. For example, notifications, or indications of notifications, may be stored by notifications server 180 at database 160 in one or more records associated with webclient 110, the communications session in use by webclient 110, or the user of webclient 110, via link 186, which may be any type or number of communications links as described herein. In some embodiments notifications may instead, or in addition, be stored in a storage, such as storage 150, with which notifications server 180 communicates via link 185, which may also be any type or number of communications links as described herein. In such embodiments, storage location information that indicates where on storage 150 the notifications are saved may be included in a record associated with webclient 110 on database 160. Alternatively, an indication that one or more notifications have been saved on storage 150 may be included in such a record, and other identifying information may be used to determine the storage location of the stored notifications. For example, a notification identifier may be stored for each notification in the record on database 160 that is associated with webclient 110, and a combination of a webclient identifier (e.g., session identifier) and a notification identifier may be used to locate the notification in storage 150. All such embodiments are contemplated as within the scope of the present disclosure. By storing notifications at database 160 or storage 150, this information may be accessible to notifications server 180 and/or other servers or devices in the event that webclient 110 can no longer communicate with HTTP server 130 for any reason.

Where notifications server 180 stores notifications in database 160 and/or storage 150, HTTP server 130 request these notifications from notifications server 180 in response to a request from webclient 110 for data or a service provided by mail server 170 or in response to a keepalive communication or other communication from webclient 110 as described herein. Upon transmission of stored notifications, notifications server 180 may remove such notifications from database 160 and/or storage 150. Alternatively, webclient 110 may transmit an acknowledgement of receipt of a notification to HTTP server 130, and HTTP server 130 may provide this acknowledgement of receipt, or another instruction generated in response to receiving an acknowledgement of receipt from webclient 110, to notifications server 180. Notifications server 180 may, in response, delete the notification from database 160 and/or storage 150 upon receipt of this acknowledgement.

Note that stored notifications may not be retained indefinitely if they are not transmitted to a webclient. In some embodiments, each notification may be stored for a predetermined amount of time and deleted upon expiration of the predetermined amount of time. Alternatively, notifications may be stored only while a session is maintained between webclient 110 and HTTP server 130. Upon expiration of the session, HTTP server 130 may delete any notifications associated with the session and/or webclient 110, or may instruct or otherwise indicate to notifications server 180 that such notifications are to be deleted.

Figure 2:
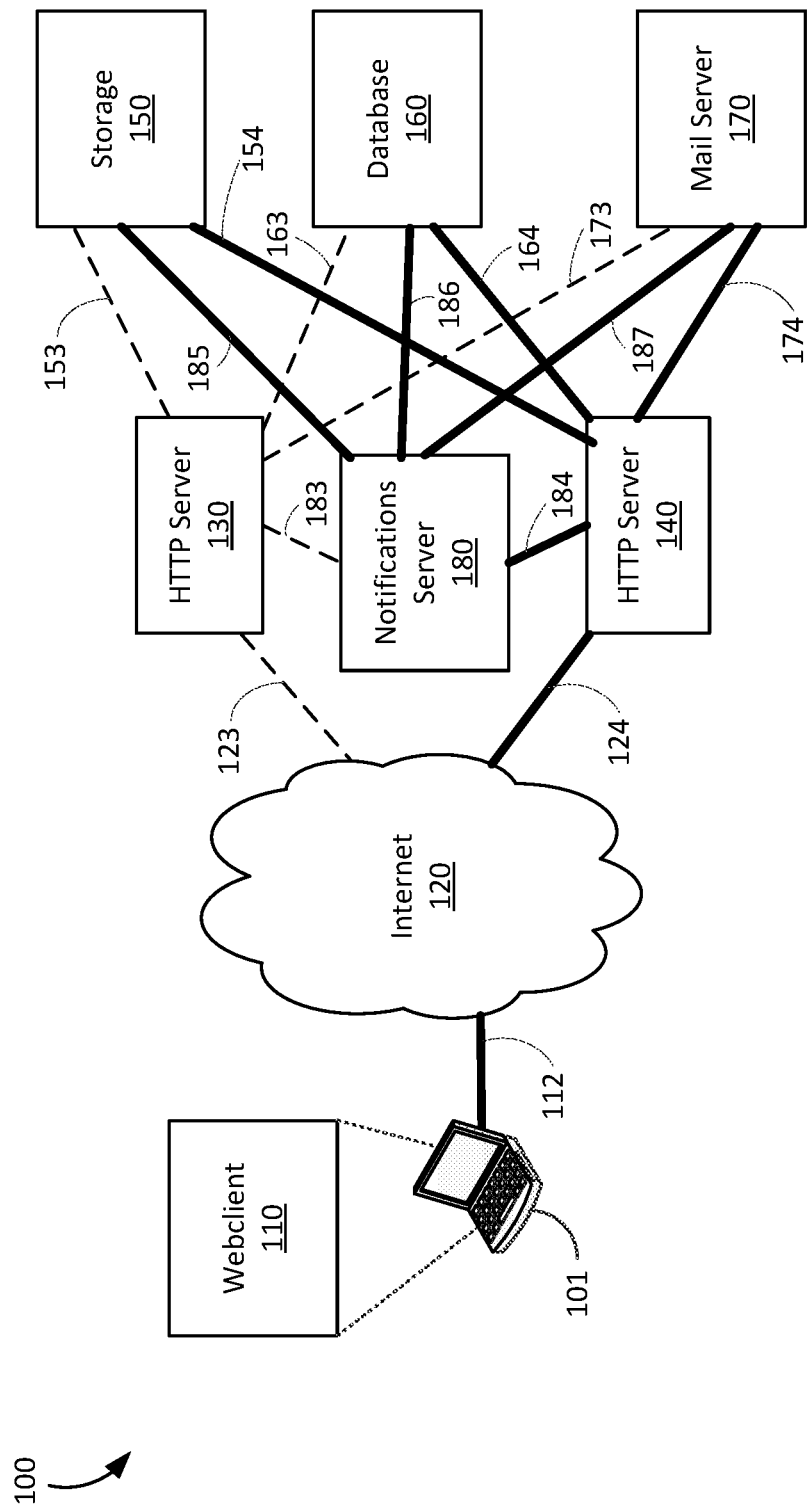
FIG. 2 illustrates another example environment in which embodiments of the invention may be implemented.

FIG. 2 illustrates non-limiting exemplary system 100 where HTTP server 130 is no longer in communication with webclient 110. This may be due to a failure of communications link 123, a failure of HTTP server 130, or any other reason. In an embodiment, HTTP server 130 may become unavailable due to failure to successfully communicate over one or more of communications links 153, 163, and 173. In such embodiments, HTTP server 130, or another system or device, may determine that communication over one or more of these links is not functional and cause HTTP traffic for webclient 110 to be diverted to HTTP server 140, even though HTTP server 130 itself may be functional. Once HTTP server 130 is no longer available to service webclient 110, traffic from webclient 110 may be redirected to HTTP server 140. This may happen automatically using any means and methods and may be transparent to webclient 110 and/or the user thereof.

HTTP server 140 may recognize that webclient 110 was formerly in communication with HTTP server 130 or otherwise determine that it is now serving clients in place of HTTP server 130 using any means or methods, including those described herein. Upon determining or acquiring data associated with webclient 110, HTTP server 140 may obtain metadata associated with webclient 110 from database 160 using communications link 164. The metadata may indicate that webclient 110 is in process of composing an email that has an associated attachment, and may also provide identifying information for the attached that may be used to retrieve the attachment from storage 150. Alternatively, the metadata may indicate that an attachment is associated with the webclient, and the storage location of the attachment may be determined using other means, such as a webclient identifier combined with an attachment identifier that may be included in the metadata. Upon determining that an attachment is associated with the email being composed using webclient 110, HTTP server 140 may obtain the attachment from storage 150 via communications link 154. Upon user command to save or send the email under composition, HTTP server 140 may transmit the attachment, and in some embodiments other email data, to mail server 170 via communications link 174. This may also be performed without user interaction where webclient 110 is configured to automatically save email.

HTTP server 140 may also, or instead, determine that notifications are stored for webclient 110 at database 160 or storage 150 using identifying information to locate a record in database 160 as described herein. Where notifications are stored at storage 150, upon determining that stored notifications exist, HTTP server 140 may obtain notification storage location information for such notifications from database 160 using communications link 164. Using this notification storage location information, HTTP server 140 may obtain any stored notifications from storage 150 and transmit them to webclient 110. Alternatively, where notifications are stored at database 160, HTTP server 140 may obtain such notifications from database 160 and transmit them to webclient 110. HTTP server 140 may then proceed to store, transmit, and delete notifications as described herein.

In embodiments utilizing a notifications server 180, HTTP server 140 may determine that notifications are stored for webclient 110 by querying notifications server 180 and providing data, such as identifying data associated with webclient (e.g., a session identifier) to notifications server 180. Notifications server 180 may then consult its own data, or query database 160 to determine whether notifications are pending for webclient 110. If so, notifications server 180 may obtain such notifications from database 160 and/or storage 150 using webclient 110 identifying information as described herein. Where notifications are stored at storage 150, upon determining that stored notifications exist, notifications server 180 may obtain notification storage location information for such notifications from database 160 using communications link 186. Using this notification storage location information, notifications server 180 may obtain any stored notifications from storage 150 and transmit them to HTTTP server 140, which may provide them to webclient 110. Alternatively, where notifications are stored at database 160, notifications server 180 may obtain such notifications from database 160 and transmit them to HTTTP server 140, which may provide them to webclient 110. Notifications server 180 may then proceed to store, transmit, and delete notifications as described herein.

Note that while the devices of FIGS. 1 and 2 are described separately and individually, these devices may be physically combined or may be several devices physically distributed across one or more datacenters or other geographical locations. For example, database 160 and storage 150 may be a single device or the functions associated with database 160 and storage 150 may be performed by one or more devices. Note also that the connections between devices may be secured using authentication and/or any other means to ensure that data exchanges between devices is less likely to be intercepted or, if intercepted, decipherable to any non-intended recipients. All such embodiments are contemplated as within the scope of the present disclosure.

Note that notifications handling, such as requesting, receiving, and subscribing to notifications, as well as storing and retrieving notifications, may be handled by a separate process within HTTP server 140 or any other HTTP server contemplated herein. For example, a first process executing on HTTP server 140 may handle communications with webclient 110 while a separate process may handle notifications. The two processes may interact in any manner in order to handle notifications and provide them to webclient 110.

Figure 3:
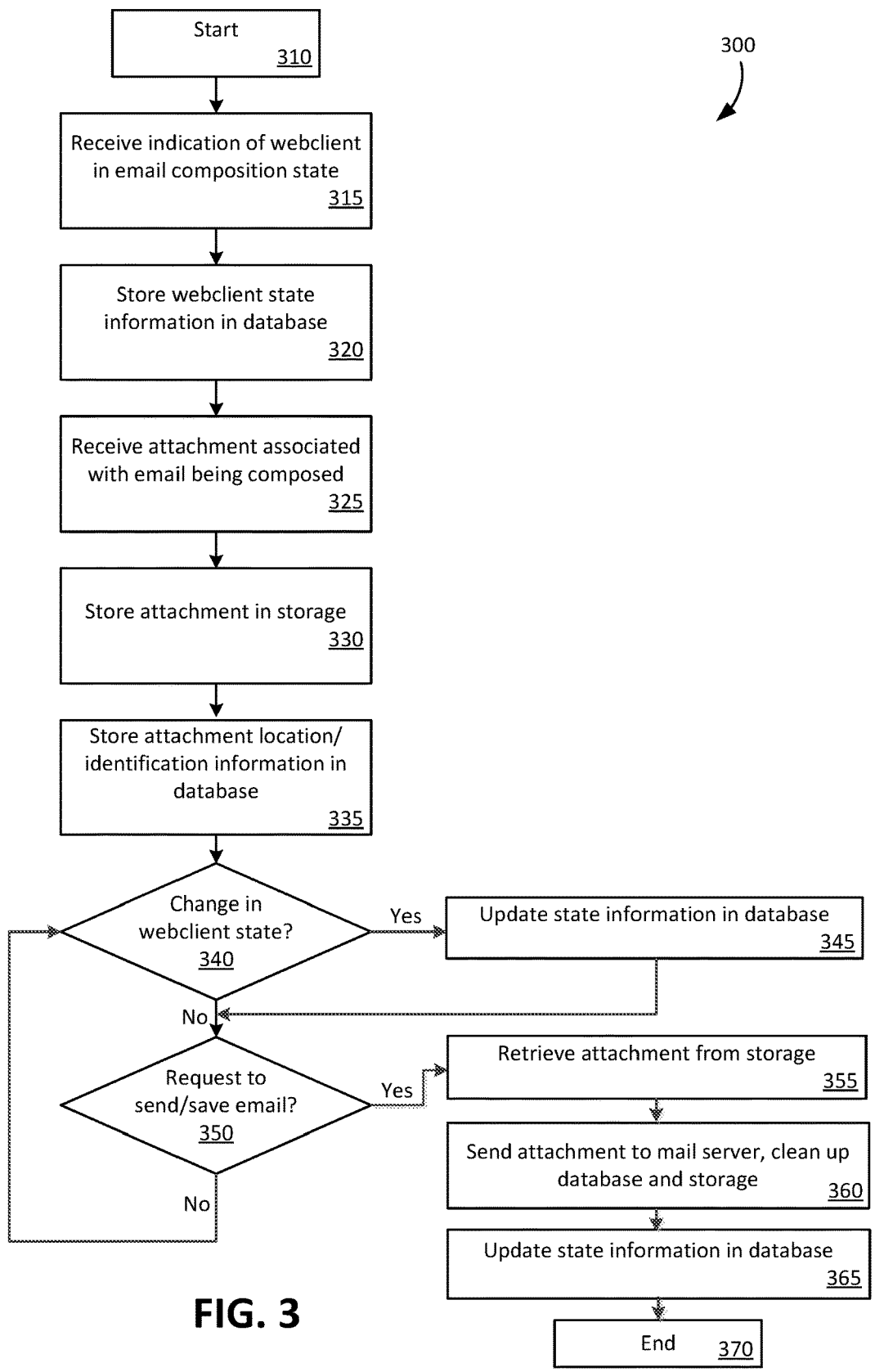
FIG. 3 depicts example operating procedures for an HTTP server according to embodiments.

FIG. 3 depicts example operating procedures 300 for an HTTP server, according to embodiments. Operating procedures 300 begin with operation 310 and move to operation 315 where an HTTP server may receive an indication of a webclient requesting service via the HTTP server for support of the composition of an email. This may take any form, including a request for access to a webpage that provides an email composition interface. At operation 320, the HTTP server may store current webclient state information in a database. For example, metadata associated with the webclient may be stored in the database. The webclient may be identified using any means, and such identification information may be used to identify a record in the database that contains metadata for the webclient. For example, a session identifier may be generated and stored as an identifier for the webclient and/or the particular communications session in which the webclient and the HTTP server are engaged. This session identifier may also be transmitted to the webclient for storage on the user device executing the webclient, in some embodiments as a "cookie" or data stored by a web browser executing on the user device.

At operation 325, the HTTP server may receive from the webclient an attachment to be associated with the email currently being composed using the webclient. This attachment may be stored, at operation 330, in a storage means, including any type of storage device and storage system as set forth herein. Note that an HTTP server may store such an attachment locally and at a storage device or system, or may transmit the attachment to the storage device or system and not retain a local copy of the attachment. Note also that an HTTP server may alter the attachment or otherwise place it into a format that is acceptable and understood by a mail server to facilitate later use of the attachment by the mail server. All such embodiments, and any variations thereof, are contemplated as within the scope of the present disclosure.

At operation 335, the information indicating the location within the storage device or storage system of the attachment may be stored in the database. This location information may be stored in a record associated with the webclient and/or the communications session in which the webclient and the HTTP server are engaged. Alternatively, an indication that an attachment has been saved rather than an indication of a particular location of the attachment may be stored in such a record. Such an indication may take any form, and may include a name or identifier of the attachment. In such embodiments, other identifying information may be used to determine the storage location of the attachment, such as a combination of a webclient identifier and an attachment identifier. Also at operation 335, state information in the database for the webclient may be updated to reflect that there is an attachment associated with an email currently under composition in the webclient.

Where no failures occur that affect communication between the webclient and the HTTP server, operating procedures 300 move to operation 340, where a determination is made as to whether any changes in the webclient state have taken place. If there have been changes in the webclient state, at operation 345 the state of the webclient is updated in the database record associated with it and/or its communication session with the HTTP server. At operation 350, a determination may be made as to whether the webclient has transmitted a request to send or save the email under composition. If so, at operation 355 the HTTP server may retrieve the attachment from the storage device or storage system, in an embodiment using location information or an attachment indication that may be stored in a record associated with the webclient and/or the communications session in which the webclient and the HTTP server are engaged. At operation 360, the HTTP server may send the attachment as well as any other email related data to the mail server, with the process ending at operation 365.

In some embodiments, the HTTP server may retrieve the attachment from the storage device or system, for example in embodiments where the HTTP server does not retain a local copy of the attachment. In other embodiments, the HTTP server may transmit a locally stored copy of the attachment to the mail server. All such embodiments and variations thereof are contemplated as within the scope of the present disclosure. In some embodiments, the HTTP server may convert or otherwise place the attachment into a format that is understood and accepted by the mail server. Also at operation 360, after transmitting the attachment to the mail server, the HTTP server may delete the attachment from the storage device or system and may also delete the attachment location information from the record associated with the webclient in the database. Alternatively, the HTTP server may delete only the attachment location information for the attachment from the record associated with the webclient in the database, retaining the attachment in the storage device or storage system for further use, such as for attachment to subsequent emails or messages.

In other embodiments, rather than transmitting the attachment to the mail server, the HTTP server may transmit attachment location information to the mail server to enable the mail server to retrieve the attachment from the storage system or device itself, for example after the HTTP server retrieves the attachment location information from local memory or from the database. In such embodiments, the attachment may have been altered or otherwise put into a format understood and accepted by the mail server before it was stored in the storage system or device. Also in such embodiments, the HTTP server may delete the attachment from the storage device after receiving notice of successful sending of the one or more emails (for example where the email has multiple recipients) that may use the attachment from the mail server and may delete the record for the webclient in the database, or delete the attachment location information for the attachment from the record associated with the webclient in the database. After the attachment and/or attachment location information is provided to the mail or messaging server, at operation 365 the state information may be updated in the database, for example, to indicate that the webclient is no longer in a message composition state. Alternatively, at operation 365, the HTTP server may delete the record for the webclient in the database. After operation 365, operating procedures 300 move to operation 370 where they end.

Figure 4:
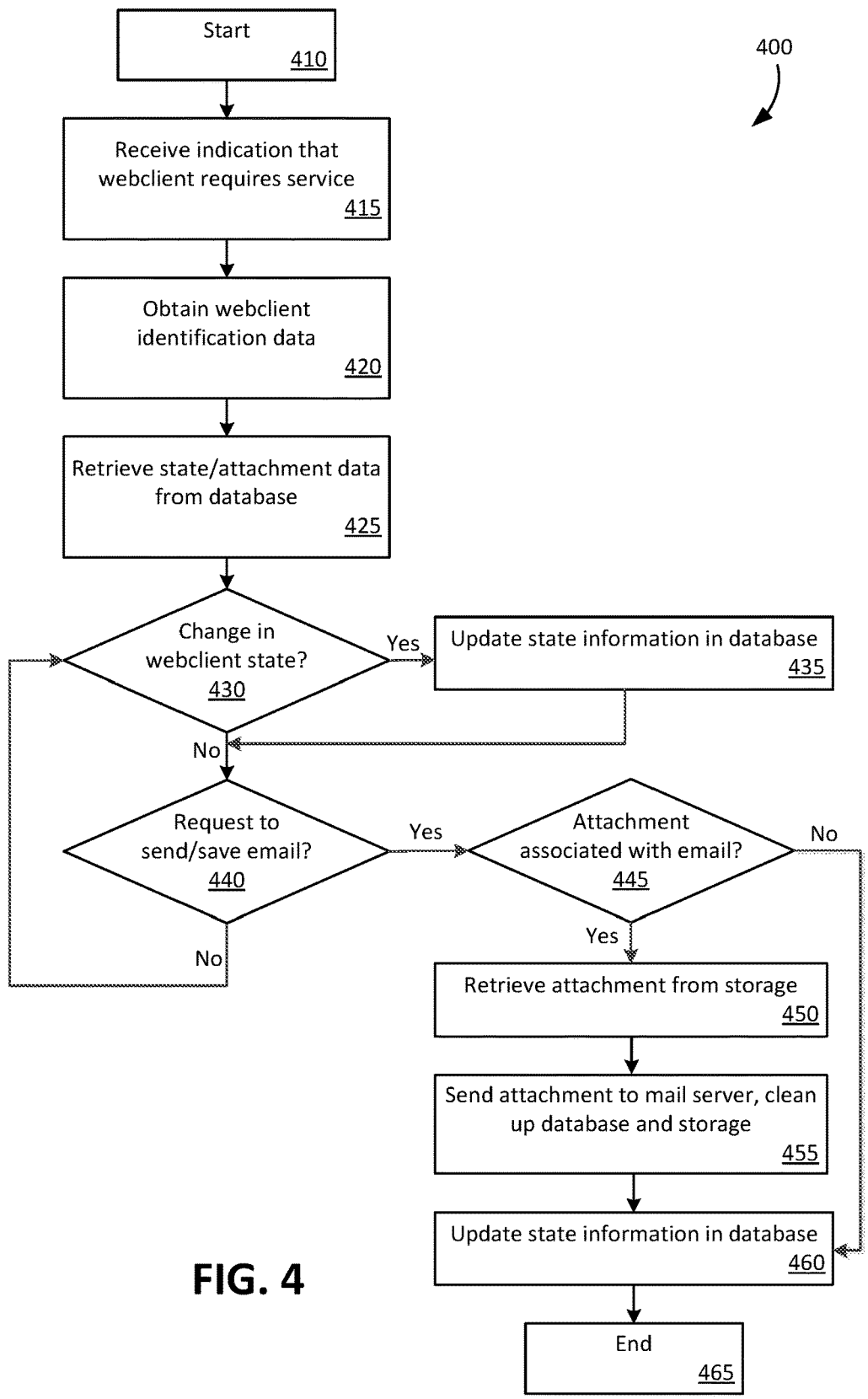
FIG. 4 depicts example operating procedures for an HTTP server according to embodiments.

Note, however, that in some embodiments, the HTTP server that originally provided service to the webclient may fail, or connectivity between the HTTP server and webclient may fail for some reason, after storing the attachment in the storage device or system. In such embodiments, a backup or redundant HTTP server may then take over HTTP server functions for the webclient. FIG. 4 depicts example operating procedures 400 for an HTTP server according to such an embodiment. Operating procedures 400 begin with operation 410 and move to operation 415 where a backup HTTP server may receive an indication that a webclient requires service. At operation 420, the HTTP server may obtain webclient identification data by, for example, retrieving a cookie from the web browser executing the webclient. Such identifying information may take the form of a session identifier that identifies the webclient and/or the particular communication session previously underway between the webclient and its former HTTP server.

Using the identifying information, the HTTP server may retrieve state information and other information regarding the webclient from the database at operation 425. This information may include data indicating whether the webclient was in an email composition state and whether the email under composition included one or more attachments. At operation 430, a determination may be made as to whether any changes in the webclient state have taken place. If there have been changes in the webclient state, at operation 435 the state of the webclient may be updated in the database record associated with it and/or its communication session with the HTTP server.

At operation 440, a determination may be made as to whether the webclient has transmitted a request to send or save the email under composition. If so, at operation 445, a determination may be made as to whether the email under composition has an attachment associated with it. If not, operating procedures 400 may move to operation 460 where state information may be updated, for example to reflect that the webclient is no longer in a message composition state. Any other operations necessary to have the email or message sent may also be taken, such as providing any email or message related data to the mail server. If there is an associated attachment, at operation 450 the HTTP server may retrieve the attachment from the storage device or system. In other embodiments, where HTTP servers store attachments in storage but do not retain local copies of the attachments, the HTTP server may not retrieve a copy of the attachment for local storage. At operation 455 the HTTP server may send the attachment as well as any other email related data to the mail server for construction and delivery of the email.

As noted with the original HTTP server, the backup HTTP server may retrieve the attachment from the storage device or system, for example in embodiments where the HTTP server does not retain a local copy of the attachment. In other embodiments, the HTTP server may transmit a locally stored copy of the attachment to the mail server. All such embodiments and variations thereof are contemplated as within the scope of the present disclosure. Also at operation 455, after transmitting the attachment to the mail server, the HTTP server may delete the attachment from the storage device or system and may also delete data associated with the attachment in the record associated with the webclient in the database. Alternatively, the HTTP server may only delete the attachment location information or attachment indication data for the attachment from the record associated with the webclient in the database, leaving the attachment in the storage device or storage system for further use, for example, where the attachment will be provided to a message server for subsequent messages.

In other embodiments, rather than transmitting the attachment to the mail server, the HTTP server may transmit attachment location information to the mail server to enable the mail server to retrieve the attachment from the storage system or device itself, for example after the HTTP server retrieves the attachment location information from local memory or from the database. In such embodiments, the HTTP server may delete the attachment from the storage device after receiving notice of successful sending of the one or more emails (for example where the email has multiple recipients) that may use the attachment from the mail server and may delete the record for the webclient in the database, or delete the attachment location information for the attachment from the record associated with the webclient in the database. After the attachment and/or attachment location information is provided to the mail or messaging server, at operation 460 the state information may be updated in the database, for example, to indicate that the webclient is no longer in a message composition state. Alternatively, at operation 460, the HTTP server may delete the record for the webclient in the database. After operation 460, operating procedures 400 move to operation 465 where they end.

Figure 5:
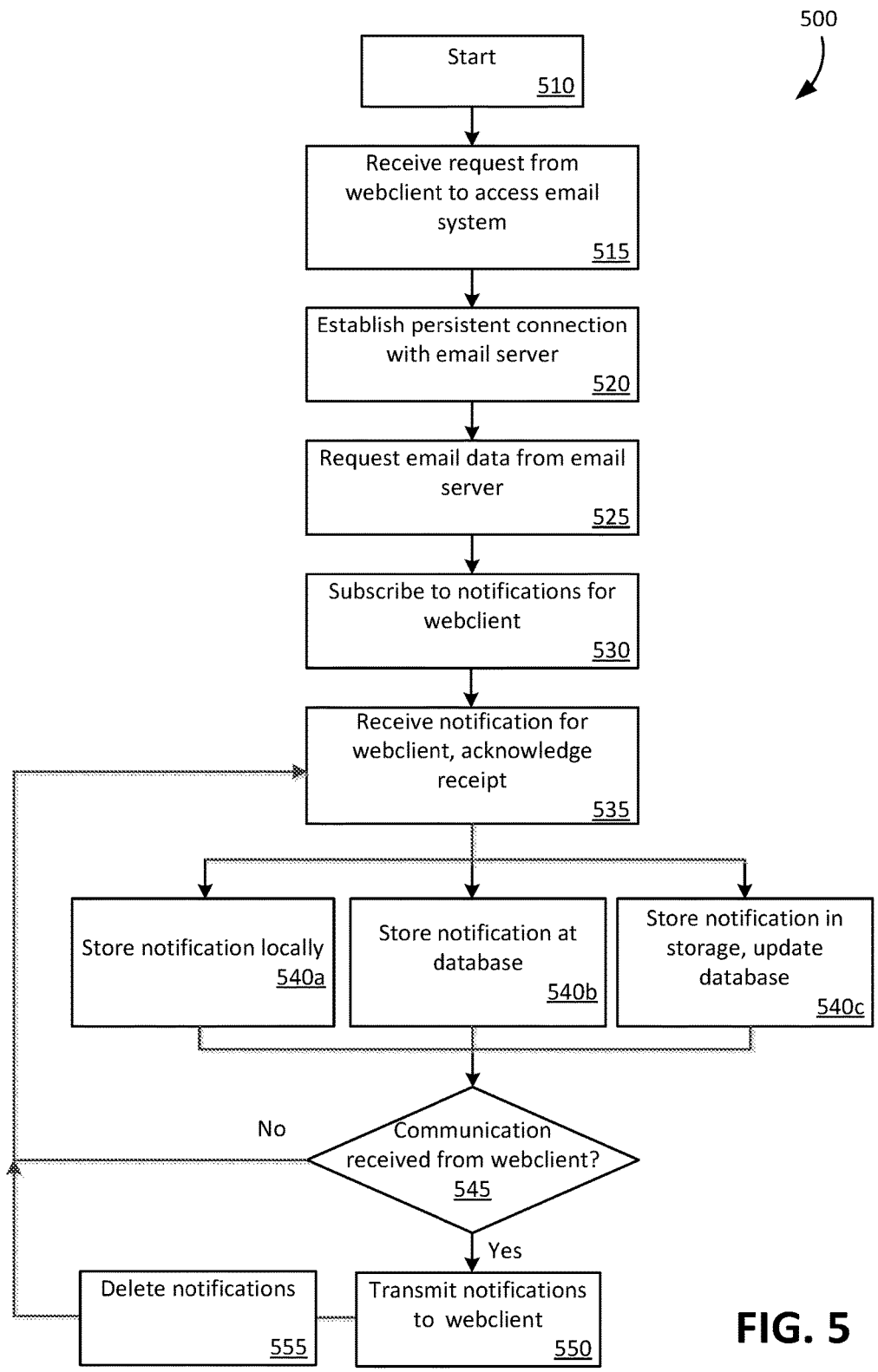
FIG. 5 depicts example operating procedures for an HTTP server according to embodiments.

FIG. 5 depicts example operating procedures 500 for an HTTP server, according to embodiments. Operating procedures 500 begin with operation 510 and move to operation 515 where an HTTP server may receive a request for a webclient to access an email system. This request may take any form, including a request to log into an email system, a request for email data, a request for notifications, and a request for access to a webpage that provides an email composition interface. Requests to interact with other types of systems, such as calendar systems and any other systems that support notifications and/or attachments are contemplated. At operation 520, the HTTP server may establish a persistent connection with the email server for communications associated with the webclient. Alternatively, at operation 520, the HTTP server may request that a notifications server establish a persistent connection with the email server, or may otherwise inform the notifications server that the HTTP server is now servicing the webclient and the notifications server may, in response, establish a persistent connect to the mail server. At operation 525, the HTTP server may request email data on behalf of the webclient. This request may be based on the request received at operation 515 or any other request received from the webclient for email data. At operation 530, the HTTP server may subscribe to notifications for the webclient. Alternatively, at operation 520, a notifications server may subscribe to notifications for the webclient in response to being informed of the HTTP server servicing the webclient. A subscription request form either device may take any form of request to receive such notifications and/or may be automatically initiated and/or established based on other activities, such as the communications transmitted from the HTTP server to the email server at operation 520 or 525.

At operation 535, the HTTP server may receive a notification intended for the webclient from the email server. Also at 535, an acknowledgement of receipt of the notification may be transmitted from the HTTP server to the email server. In response to receiving this notification, the HTTP server may store the notification. In one embodiment, at operation 540a, the HTTP server may store the request locally (e.g., in local memory, local hard disk, etc.). In an alternative embodiment, the HTTP server may store the notification in a database, and may associate the record in which the notification is stored with the webclient. This record may be identified and/or accessed using any means, including those set forth herein (e.g., using a session identifier, etc.). In yet another embodiment, the notification may be stored in a storage device and a location of the notification in the storage device may be indicated in a database record using any means, including those set forth herein (e.g., using a session identifier to identify a record containing the notification, using a session identifier to identify a record containing an indication of a notification that may be located using a combination of the indication of the notification and the session identifier, etc.). Any other means and methods of storing the notification and identifying it for future retrieval are contemplated as within the scope of the present disclosure.

Alternatively, a notifications server may perform receipt and storage of notifications. Accordingly, at operation 535, the notifications server may receive a notification intended for the webclient from the email server. Also at 535, an acknowledgement of receipt of the notification may be transmitted from the notifications server to the email server. In response to receiving this notification, the notifications server may store the notification. In one embodiment, at operation 540a, the notifications server may store the request locally (e.g., in local memory, local hard disk, etc.). In an alternative embodiment, the notifications server may store the notification in a database, and may associate the record in which the notification is stored with the webclient. This record may be identified and/or accessed using any means, including those set forth herein (e.g., using a session identifier, etc.). In yet another embodiment, the notification may be stored in a storage device and a location of the notification in the storage device may be indicated in a database record using any means, including those set forth herein (e.g., using a session identifier to identify a record containing the notification, using a session identifier to identify a record containing an indication of a notification that may be located using a combination of the indication of the notification and the session identifier, etc.). Any other means and methods of storing the notification and identifying it for future retrieval are contemplated as within the scope of the present disclosure.

At operation 545, a determination may be made as to whether a communication has been received by the HTTP server since the notification has been stored. If not, the operations may return to operations 535 where subsequent notifications may be received and stored by the HTTP server. If a communication has been received by the HTTP server since the notification has been stored, at operation 550 the notification may be retrieved as described herein and transmitted to the webclient (e.g., retrieved by the HTTP server directly, or retrieved by a notifications server upon request from the HTTP server and provided thereto by the notifications server). Any other notifications that have been stored since the last communication with the webclient may also be retrieved and transmitted to the webclient. The communication received from the webclient may be of any type, including a keepalive or a request for email data or further interaction with the email system. If the communication is a request for data or interaction with the email system, the responsively provided email data or communications from the email system may be provided with the notifications to the webclient.

At operation 555, any notifications transmitted to the webclient may be deleted by the HTTP server or the notifications server from local storage, a storage device, and/or a database. Alternatively, the transmitted notifications may be retained for a predetermined amount of time or until a user requests their deletion. Any deletion and cleanup means and methods are contemplated as within the scope of the present disclosure. After transmission of the notifications, the HTTP server may await additional notifications, returning to operation 535. Should the session with the webclient timeout or otherwise be discontinued, the operations may terminate.

Figure 6:
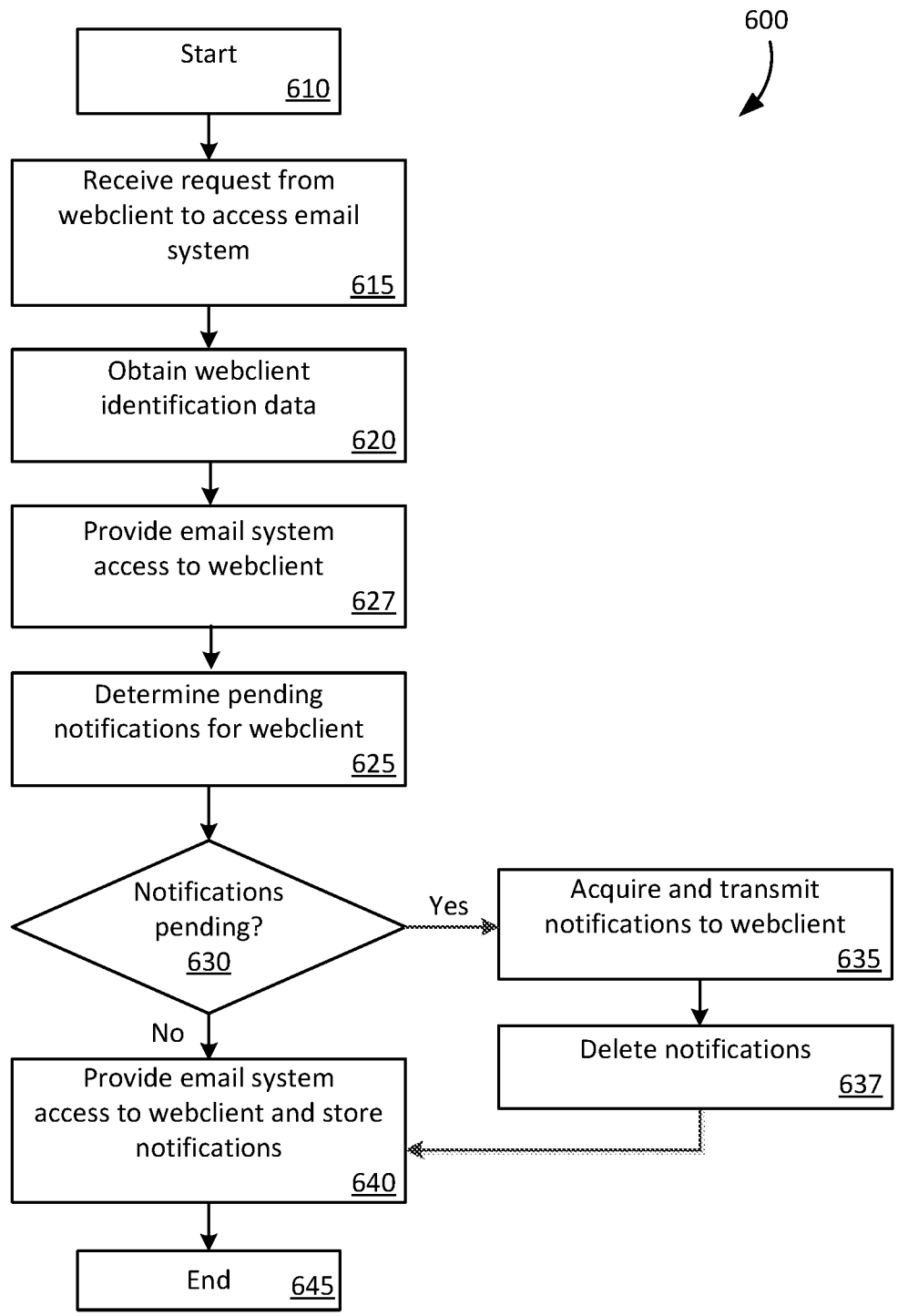
FIG. 6 depicts example operating procedures for an HTTP server according to embodiments.

In some embodiments, the HTTP server that originally provided service, including stored notifications (directly or using a notifications server), to the webclient may fail, or connectivity between the HTTP server and webclient may fail, after storing the attachment in the storage device or system. Alternatively, the HTTP server servicing the webclient may change due to any other reason, such as relocation of the device executing the webclient. In such embodiments, a backup or redundant HTTP server may then take over HTTP server functions for the webclient. FIG. 6 depicts example operating procedures 600 for an HTTP server according to such an embodiment. Operating procedures 600 begin with operation 610 and move to operation 615 where a backup HTTP server may receive an indication that a webclient requires service. At operation 620, the HTTP server may obtain webclient identification data by, for example, retrieving a cookie from the web browser executing the webclient. Such identifying information may take the form of a session identifier that identifies the webclient and/or the particular communication session previously underway between the webclient and its former HTTP server. Using the received identifying information, the HTTP server may begin providing email system access to the webclient at operation 627. This may include establishing a persistent connection to an email server, and storing and transmitting any forthcoming notifications as described herein, or otherwise instructing a notifications server to handle notifications as described herein. In other embodiments, the HTTP server may not provide email system access to the webclient until after checking for notifications as described herein.

Using the identifying information, the HTTP server may determine whether pending notifications (i.e., notifications not yet sent to the webclient by the HTTP server) are present for the webclient at operation 625. This may include querying a database to determine if a record associated with the webclient indicates or contains any notifications associated with the webclient. Alternatively the HTTP server may query a notifications server that may respond with an indication of pending notifications or by transmitting the notifications. If, at operation 630, it is determined that no pending notifications exist, at operation 640, the HTTP server may begin, or continue to, provide email system access to the webclient. This may include establishing a persistent connection to an email server, and storing and transmitting any forthcoming notifications as described herein. Alternatively, this may include instructing a notifications server to handle notifications as described herein. Note that in some embodiments, the HTTP server may first establish a connection to the email server on behalf of the webclient and request email data and/or services before checking for notifications. All such embodiments are contemplated as within the scope of the present disclosure.

If at operation 630 it is determined that there are notifications that have not yet been provided to the webclient, at operation 635 such notifications may be retrieved, for example from a database or storage as described herein, or from querying or otherwise instructing a notifications server to provide the notifications. The notifications may be transmitted to the webclient. These notifications may be transmitted with any data that may be forthcoming from an email server or transmitted in a dedicated communication. After providing such notifications to the webclient, at operation 637 the HTTP server may delete the notifications from their storage location (e.g., local, database, storage) or, where a notifications server is in use, the notifications server may delete the notifications. Alternatively, acknowledgement of receipt of the notifications may be received from the webclient, and, in response, the HTTP server or the notifications server may delete the notifications.

At operation 640, the HTTP server may provide email system access to the webclient, including by establishing a persistent connection to an email server, and store and transmit any forthcoming notifications as described herein. Note that in some embodiments, the HTTP server may first establish a connection to the email server on behalf of the webclient and request email data and/or services before retrieving and transmitting any notifications. All such embodiments are contemplated as within the scope of the present disclosure. After operation 640, operating procedures 600 move to operation 645 where they end.

Figure 7:
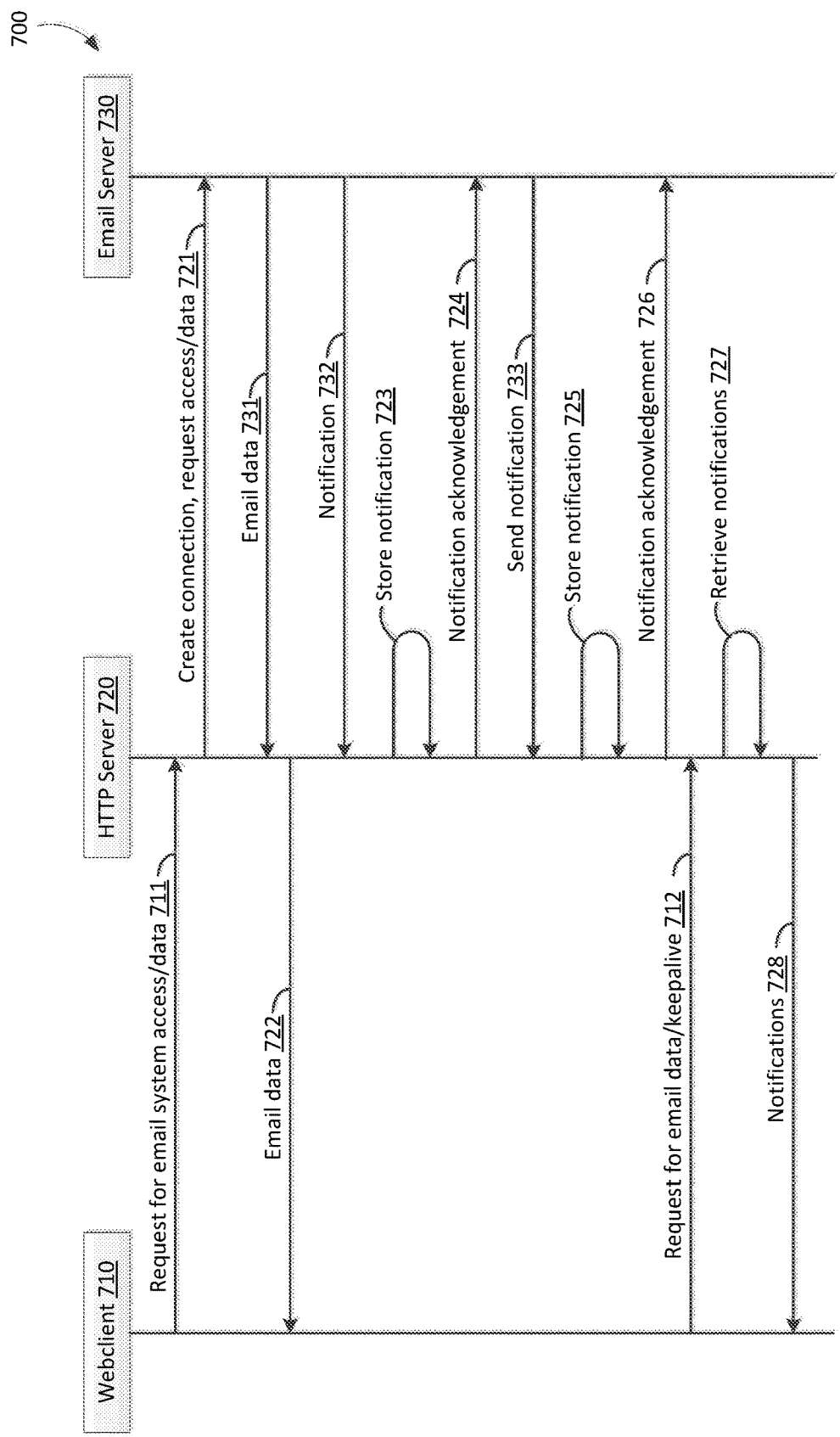
FIG. 7 depicts an example signal flow according to embodiments.

FIG. 7 illustrates exemplary non-limiting signal flow 700 showing example communications that may occur between a webclient, an HTTP server (and, in some embodiments, a notifications server), and an email server according to some embodiments of the present disclosure. Note that in notifications server embodiments, HTTP server 720 represents both an HTTP server and a notifications server, and their interactions are set forth in detail below. Webclient 710 may request email system access or data from, or otherwise transmit a communication relating to an email system to, HTTP server 720 at communication 711. In response, HTTP server 720 may transmit request 721 to establish a connection (e.g., a persistent connection) with email server 730, retrieve email data, subscribe to notifications for webclient 710, and/or otherwise communicate with email server 730 on behalf of webclient 710.

Alternatively, in response to communication 711, HTTP server 720 may inform a notifications server, or otherwise instruct a notifications server, to transmit request 721 to establish a connection (e.g., a persistent connection) with email server 730 and subscribe to notifications for webclient 710. Response 731 may be transmitted from email server 730 to HTTP server 720 that may include any data, such as confirmation of receipt of request 721, email data, connection data, etc. HTTP server may transmit communication 722 to webclient 710 in response, which may include any data provided by email server 730 intended for webclient 710.

Notification 732 may be transmitted to HTTP server 720, for example in response to detection or generation of an event by email server 730. Alternatively, notification 732 may be transmitted to a notifications server. Such an event may be any type of event of which a user may be notified, including receipt of an email, a calendar reminder, a meeting invitation, etc. At 723, HTTP server 720 or a notifications server associated therewith may store the notification in any manner, including storing the notification locally, storing the notification in a database record with identifying information associated with webclient 710, or storing the notification in a storage and storing notification location information in a database record with identifying information associated with webclient 710. Acknowledgment 724 of receipt of the notification may be transmitted to email server 730 by HTTP server 720 or the notifications server. Subsequent notification 733 may be received by HTTP server 720 or the notifications server, stored at 725, and acknowledged at 726. Any other subsequent notifications may be similarly received, stored, and acknowledged by HTTP server 720 or the notifications server.

HTTP server 720 may receive communication 712 from webclient 710 that may be a request for additional email data or interaction with email server 730. In such embodiments, HTTP server 720 may forward this request to email server 730 and receive a response from email server 730. Alternatively, communication 712 may merely be a keepalive transmitted by webclient 710 according to normal operating procedures. In response to receipt of communication 712, HTTP server 720 may retrieve any pending notifications for webclient 710. This may include local retrieval, retrieval from a database, retrieval from a storage device, retrieval by query of the notifications server as described herein, or any other retrieval methods and means. Pending notifications may be transmitted to webclient 710 in communication 728, which may also include any other data or communications that may have been generated or received in response to communication 712.

Note that, as mentioned above, the embodiments set forth herein are not limited to use with email service providers and email servers and systems, but may also be used in any system where a user may be composing any type of message that may include an attachment and a connection to an HTTP server may be disrupted during the composition process, or any system where notifications intended for user consumption may be generated. For example, many social messaging websites and other websites that allow user interaction provide messaging capabilities that allow users to send one another messages that include attachments and send notifications to users indicating new messages or event occurrences. Calendar services and meeting coordination services may also send notifications to users alerting users of invitations to meetings and impending events. One skilled in the art will appreciate that the disclosed embodiments can be readily applied to such systems, and all such applications are contemplated as embodiments that are within the scope of the present disclosure.

Note also that the instant embodiments may also be used with any other systems that associate one or more files with a webclient or provide notifications to users. For example, some systems allow a user to upload a file to a server or other device(s) using a webclient. In such systems, when the file being uploaded is relatively large, it may be split into two or more parts to facilitate the uploading of the file (may be referred to as a "multipart upload"). In an embodiment, such a system may save state information for a webclient in a database and store one or more portions of the file being uploaded in a storage device or system as described herein. Location information may be stored in a database record associated with the webclient or otherwise determined as described herein in regards to message attachments. In such embodiments, if an HTTP server with which a webclient is communicating while performing a multipart upload becomes unavailable, a backup or failover HTTP server may determine whether the webclient was in process of a multipart upload and if so, where one or more portions of the multipart upload may be stored. In this way, such a system may prevent having the webclient resend portions of the multipart upload that were already received by the HTTP server initially serving the webclient.

Figure 8:
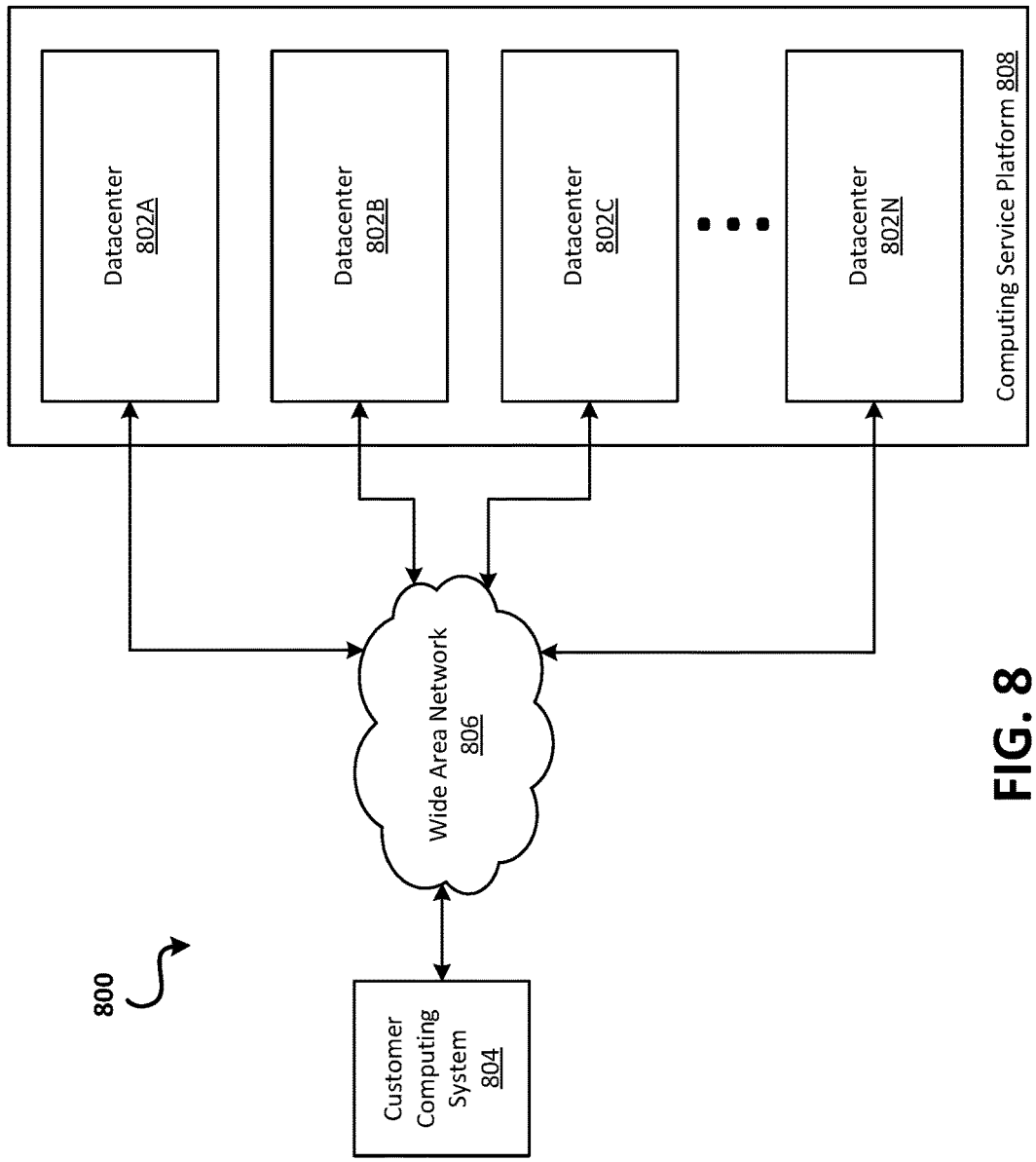
FIG. 8 depicts an example of a suitable computing environment in which embodiments described herein may be implemented.
Figure 9:
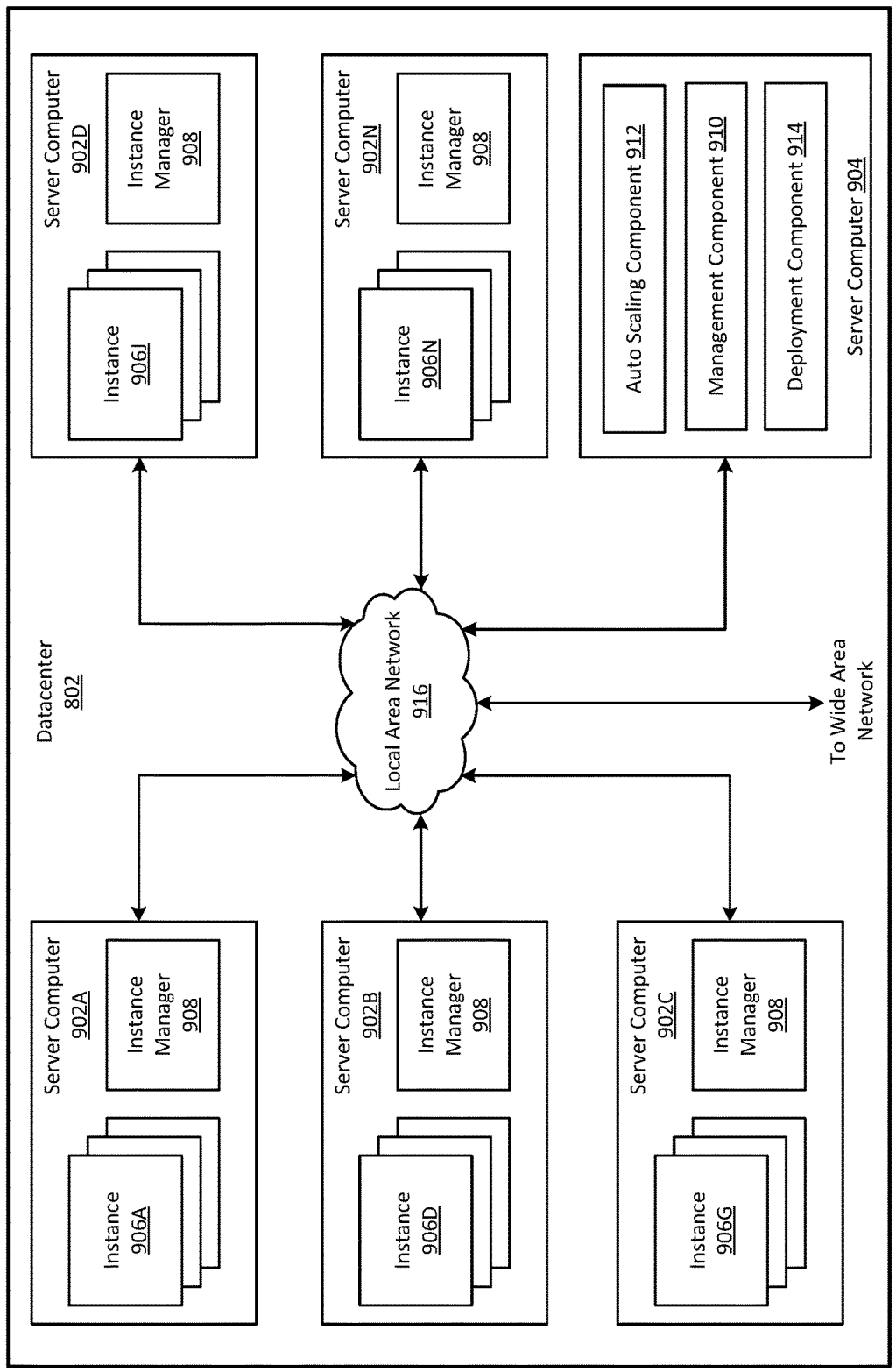
FIG. 9 depicts a computing system diagram that illustrates one configuration for datacenter that implements computing services platform.
Figure 10:
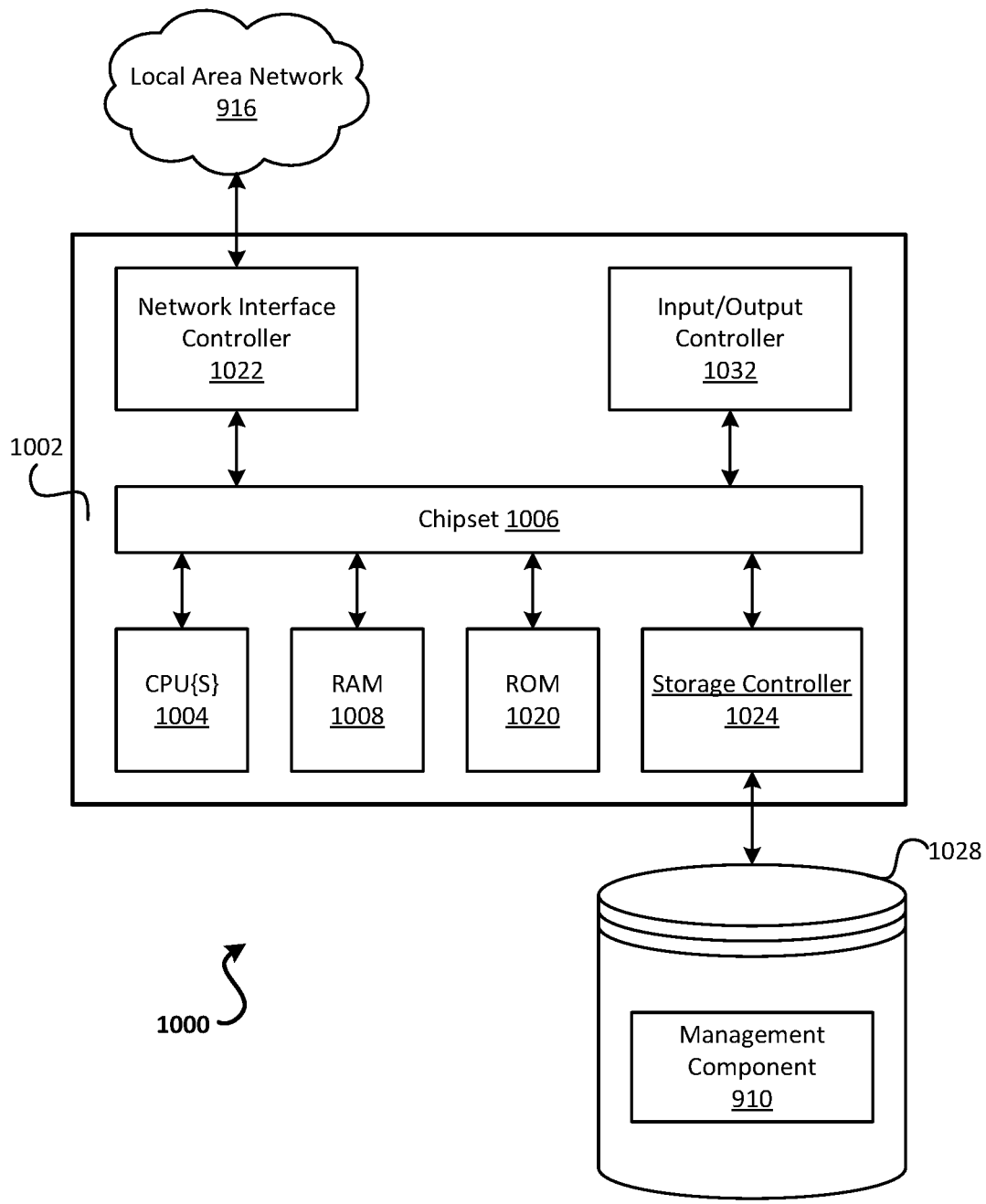
FIG. 10 depicts an example computer architecture for a computer capable of executing the above-described software components.

FIGS. 8-10 are similar to FIGS. 1 and 2 in that they depict example operating environments in which embodiments disclosed herein may be implemented, and these figures depict these operating environments at varying levels of granularity. FIG. 8 generally depicts a programmable execution service platform that comprises a plurality of datacenters. FIG. 9 generally depicts a datacenter that comprises a plurality of computers. FIG. 10 generally depicts a computer.

It may be appreciated that these operating environments of FIGS. 8-10 may be used to implement aspects of the operating environments of FIGS. 1 and 2. For example, HTTP servers 130 and 140, storage 150, database 160, and mail server 170 may be implemented in a datacenter 802 of FIG. 8, or across multiple datacenters 802 of FIG. 8. Likewise, Internet 120 of FIGS. 1 and 2 may be wide area network of FIG. 8, and user device 101 of FIG. 1 may be customer computing system 804 of FIG. 8.

Within a datacenter 802 of FIG. 8, HTTP servers 130 and 140, storage 150, database 160, and mail server 170 may each be a server computer 902 or 904 of FIG. 9 (which itself may be computer 1000 of FIG. 10). Communications links 112, 123, 124, 153, 154, 163 164, 173, and 174 of FIGS. 1 and 2 may be portions of local area network 916 of FIG. 9.

Turning now to details of FIG. 8, FIG. 8 depicts an example of a suitable computing environment in which embodiments described herein may be implemented. A cloud service provider (such as computing service platform 808) may configure the illustrated computing environment to host virtual clouds of entities and to enable communication paths between these virtual clouds that may otherwise be isolated. In particular, FIG. 8 is a system and network diagram that shows an illustrative operating environment 800 that includes a computing service platform 808 for implementing virtual clouds and for providing on-demand access to computing resources, such as virtual machine instances. Computing service platform 808 can provide computing resources for executing applications on a permanent or an as-needed basis and may be configured as a private network. These computing resources may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including mail servers, web servers, HTTP servers, storage servers, application servers, media servers, database servers, and the like. Data storage resources may include file storage devices, block storage devices and the like.

Each type or configuration of computing resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as web servers, HTTP servers, and/or one large processing resource as a database server, for example.

The computing resources provided by computing service platform 808 may be enabled by one or more datacenters 802A-802N, which may be referred herein singularly as "datacenter 802" or in the plural as "datacenters 802." Datacenters 802 may be facilities that house and operate computer systems and associated components and may include redundant and backup power, communications, cooling and security systems. Datacenters 802 may be located in a same geographical area, such as in a same facility, and may be interconnected using private networks, such as high-speed fiber optic networks, controlled and managed by a service provider of computing service platform 808. Datacenters 802 may also be distributed across geographically disparate locations and may be interconnected in part using public networks, such as the Internet. One illustrative configuration for datacenter 802 that implements the concepts and technologies disclosed herein is described below with regard to FIG. 9.

Entities of computing service platform 808 may access the computing resources provided by datacenters 802 over a wide-area network ("WAN") 806. Although a WAN is illustrated in FIG. 8, it should be appreciated that a local-area network ("LAN"), the Internet or any other networking topology known in the art that connects datacenters 802 to remote entities and other users may be utilized. It should also be appreciated that combinations of such networks may also be utilized.

An entity or other entities that are customers of computing service platform 808 may utilize a customer computing system 804 to access the computing resources provided by datacenters 802. Customer computing system 804 may include a computer capable of accessing computing service platform 808, such as a server computer, a desktop or laptop personal computer, a tablet computer, a wireless telephone, a PDA, an e-reader, a game console, a set-top box or any other computing device.

As is described in greater detail below, customer computing system 804 may be utilized to configure aspects of the computing resources provided by computing service platform 808. In this regard, computing service platform 808 may provide a web interface through which aspects of its operation may be configured through the use of a web browser application program executing on customer computing system 804. Alternatively, a stand-alone application program executing on customer computing system 804 may access an application programming interface (API) exposed by computing service platform 808 for performing the configuration operations. Other mechanisms for configuring the operation of computing service platform 808, including launching new virtual machine instances on computing service platform 808, may also be utilized.

According to embodiments disclosed herein, capacities of purchased computing resources provided by computing service platform 808 may be scaled in response to demand. In this regard, scaling refers to the process of instantiating, which may also be referred to herein as "launching" or "creating," or terminating, which may also be referred to herein as "de-scaling," instances of computing resources in response to demand.

Auto scaling may be one mechanism for scaling computing resources in response to increases or lulls in demand for the resources. Auto scaling may allow entities of computing service platform 808 to scale their purchased computing resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in computing service platform 808.

Computing service platform 808 may also be configured with a deployment component to assist entities in the deployment of new instances of computing resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of computing resources.

FIG. 9 depicts a computing system diagram that illustrates one configuration for datacenter 802 that implements computing service platform 808. The example datacenter 802 shown in FIG. 9 may include several server computers 902A-902N, which may be referred herein singularly as "server computer 902" or in the plural as "server computers 902," for providing computing resources for hosting virtual clouds and for executing applications. Server computers 902 may be standard tower or rack-mount server computers configured appropriately for providing the computing resources described above. For instance, in one implementation server computers 902 may be configured to provide instances 906A-906N of computing resources.

Instances 906A-906N, which may be referred herein singularly as "instance 906" or in the plural as "instances 906," may be virtual machine instances. As known in the art, a virtual machine instance is an instance of a software implementation of a machine (i.e., a computer) that executes programs like a physical machine. In the example of virtual machine instances, each server computer 902 may be configured to execute an instance manager 908 capable of executing the instances. Instance manager 908 may be a hypervisor or another type of program configured to enable the execution of multiple instances 906 on a single server computer 902, for example. Each of instances 906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 802 shown in FIG. 9 may also include a server computer 904 reserved for executing software components for managing the operation of datacenter 802, server computers 902 and instances 906. In particular, server computer 904 may execute a management component 910. As discussed above, an entity of computing service platform 808 may utilize customer computing system 804 to access management component 910 to configure various aspects of the operation of computing service platform 808 and instances 906 purchased by the entity. For example, the entity may purchase instances and make changes to the configuration of the instances. The entity may also specify settings regarding how the purchased instances are to be scaled in response to demand. The entity may also provide requests to launch instances to management component 910.

As also described briefly above, an auto scaling component 912 may scale instances 906 based upon rules defined by an entity of computing service platform 808. For example, auto scaling component 912 may allow an entity to specify scale up rules for use in determining when new instances should be instantiated and scale down rules for use in determining when existing instances should be terminated.

Auto scaling component 912 may execute on a single server computer 904 or in parallel across multiple server computers 902 in computing service platform 808. In addition, auto scaling component 912 may consist of a number of subcomponents executing on different server computers 902 or other computing devices in computing service platform 808. Auto scaling component 912 may be implemented as software, hardware or any combination of the two. Auto scaling component 912 may monitor available computing resources in computing service platform 808 over an internal management network, for example.

As discussed briefly above, datacenter 802 may also be configured with a deployment component 914 to assist entities in the deployment of new instances 906 of computing resources. Deployment component 914 may receive a configuration from an entity that includes data describing how new instances 906 should be configured. For example, the configuration may specify one or more applications that should be installed in new instances 906, provide scripts and/or other types of code to be executed for configuring new instances 906, provide cache warming logic specifying how an application cache should be prepared and other types of information.

Deployment component 914 may utilize the entity-provided configuration and cache warming logic to configure, prime and launch new instances 906. The configuration, cache warming logic, and other information may be specified by an entity using management component 910 or by providing this information directly to deployment component 914. Other mechanisms may also be utilized to configure the operation of deployment component 914.

In the example datacenter 802 shown in FIG. 9, an appropriate LAN 916 may be utilized to interconnect server computers 902A-902N and server computer 904. LAN 916 may also be connected to WAN 806 illustrated in FIG. 8. It should be appreciated that the network topology illustrated in FIGS. 8 and 9 has been greatly simplified and that many more networks and networking devices may be utilized to interconnect the various computing systems disclosed herein. Appropriate load balancing devices or software modules may also be utilized for balancing a load between each of datacenters 802A-802N, between each of server computers 902A-902N in each datacenter 802 and between instances 906 purchased by each entity of computing service platform 808. These network topologies and devices should be apparent to those skilled in the art.

It should be appreciated that datacenter 802 described in FIG. 9 is merely illustrative and that other implementations may be utilized. In particular, functionality described herein as being performed by management component 910, auto scaling component 912 and deployment component 914 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 10 depicts an example computer architecture for a computer 1000 capable of executing the above-described software components. The computer architecture shown in FIG. 10 illustrates a conventional server computer, workstation, desktop computer, laptop, tablet, network appliance, PDA, e-reader, digital cellular phone or other computing device, and may be utilized to execute any aspects of the software components presented herein described as executing on user device 101, HTTP servers 130 and 140, storage 150, database 160, mail server 170, within datacenters 802A-802N, on server computers 902A-902N, on the customer computing system 804 or on any other computing system mentioned herein.

Computer 1000 may include a baseboard, or "motherboard," which is a printed circuit board to which a multitude of components or devices may be connected by way of a system bus or other electrical communication paths. One or more central processing units ("CPUs") 1004 may operate in conjunction with a chipset 1006. CPUs 1004 may be standard programmable processors that perform arithmetic and logical operations necessary for the operation of computer 1000.

CPUs 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 1006 may provide an interface between CPUs 1004 and the remainder of the components and devices on the baseboard. Chipset 1006 may provide an interface to a random access memory ("RAM") 1008 used as the main memory in computer 1000. Chipset 1006 may further provide an interface to a computer-readable storage medium such as a read-only memory ("ROM") 1020 or non-volatile RAM ("NVRAM") for storing basic routines that may help to start up computer 1000 and to transfer information between the various components and devices. ROM 1020 or NVRAM may also store other software components necessary for the operation of computer 1000 in accordance with the embodiments described herein.

Computer 1000 may operate in a networked environment using logical connections to remote computing devices and computer systems through network 916. Chipset 1006 may include functionality for providing network connectivity through a network interface controller ("NIC") 1022, such as a gigabit Ethernet adapter. NIC 1022 may be capable of connecting the computer 1000 to other computing devices over network 916. It should be appreciated that multiple NICs 1022 may be present in computer 1000, connecting the computer to other types of networks and remote computer systems.

Computer 1000 may be connected to a mass storage device 1028 that provides non-volatile storage for the computer. Mass storage device 1028 may store system programs, application programs, other program modules and data, including message attachments, webclient state data, and notifications, which have been described in greater detail herein. Mass storage device 1028 may be connected to computer 1000 through a storage controller 1024 connected to chipset 1006. Mass storage device 1028 may consist of one or more physical storage units. Storage controller 1024 may interface with the physical storage units through a serial attached ("SAS") Small Computer System Interface ("SCSI") interface, a serial advanced technology attachment ("SATA") interface, a fiber channel ("FC") interface or other type of interface for physically connecting and transferring data between computers and physical storage units.

Computer 1000 may store data on mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units, whether mass storage device 1028 is characterized as primary or secondary storage and the like.

For example, computer 1000 may store information to mass storage device 1028 by issuing instructions through storage controller 1024 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 1000 may further read information from mass storage device 1028 by detecting the physical states or characteristics of one or more particular locations within the physical storage units.

In addition to mass storage device 1028 described above, computer 1000 may have access to other computer-readable storage media to store and retrieve information, such as program modules, data structures or other data. It will be appreciated by those skilled in the art that computer-readable storage media can be any available media that provides for the storage of non-transitory data and that may be accessed by computer 1000.

By way of example and not limitation, computer-readable storage media may include volatile and non-volatile, transitory and non-transitory, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices or any other medium that can be used to store the desired information in a non-transitory fashion.

Mass storage device 1028 may store an operating system utilized to control the operation of the computer 1000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1028 may store other system or application programs and data utilized by computer 1000, such as management component 910 and/or the other software components described above.

Mass storage device 1028 or other computer-readable storage media may also be encoded with computer-executable instructions, which, when loaded into computer 1000, transforms the computer from a general-purpose computing system into a special-purpose computer capable of implementing the embodiments described herein. These computer-executable instructions transform computer 1000 by specifying how CPUs 1004 transition between states, as described above. Computer 1000 may have access to computer-readable storage media storing computer-executable instructions, which, when executed by computer 1000, may perform operating procedures depicted in FIGS. 3-6.

Computer 1000 may also include an input/output controller 1032 for receiving and processing input from a number of input devices, such as a keyboard, a mouse, a touchpad, a touch screen, an electronic stylus or other type of input device. Similarly, input/output controller 1032 may provide output to a display, such as a computer monitor, a flat-panel display, a digital projector, a printer, a plotter or other type of output device. It will be appreciated that computer 1000 may not include all of the components shown in FIG. 10, may include other components that are not explicitly shown in FIG. 10 or may utilize an architecture completely different than that shown in FIG. 10.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein may be implemented in software, in hardware, or in a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks, operations, and states may be performed in an order other than that specifically disclosed, or multiple blocks or states may be combined in a single block or state. The example blocks, operations, and states may be performed in serial, in parallel or in some other manner. Blocks, operations, and states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. An email notification method comprising:
   establishing a persistent connection to an email server in response to receiving a message that a first HTTP server is servicing a webclient;
   receiving a first notification from the email server indicative that email has been received for the webclient;
   storing the first notification in a storage location; and
   in response to receiving a communication from the first HTTP server, providing information to the first HTTP server to retrieve the stored first notification from the storage location; and
   in response to receiving a subsequent communication from a second HTTP server, providing information to the second HTTP server to retrieve one or more notifications stored in the storage location subsequent to the first notification.

2. The method as recited in claim 1, wherein the first notification is stored in a database in the storage location, the first notification stored based on information identifying the webclient.

3. The method as recited in claim 2, further comprising causing the first notification to be deleted from the database based upon a predetermined event.

4. The method as recited in claim 3, wherein the predetermined event comprises a preset time.

5. The method as recited in claim 1 further comprising transmitting an acknowledgement of receipt of the notification to the to the email server.

6. The method as recited in claim 1 further comprising associating a session identifier with the stored notification.

7. The method as recited in claim 1 wherein the communication comprises a subscription to notifications associated with the webclient.

8. An email notification system, comprising:
   one or more computing processors having stored thereon computer readable instructions that upon execution by the one or more computing processors, at least cause the system to:
   establish a persistent connection to an email server in response to receiving a message that a first HTTP server is servicing a webclient;
   receive information from the email server indicative that at least one email message has been received for the webclient;
   store information indicative of a first notification that at least one email message has been received based on the received information; and
   in response to receiving a communication from the first HTTP server, provide information to the first HTTP server to retrieve the stored first notification; and
   in response to receiving a subsequent communication from a second HTTP server, provide information to the second HTTP server to retrieve one or more notifications stored subsequent to the first notification.

9. The system as recited in claim 8, wherein the first notification is stored in a database in the storage location, the first notification stored based on information identifying the webclient.

10. The system as recited in claim 8, wherein the computer readable instructions that upon execution by the one or more computing nodes, at least cause the system to cause the notification to be deleted based upon a predetermined event.

11. The system as recited in claim 10, wherein the predetermined event comprises a preset time.

12. The system as recited in claim 8 wherein the computer readable instructions that upon execution by the one or more computing nodes, at least cause the system to transmit an acknowledgement of receipt of the notification to the to the email server.

13. The system as recited in claim 8 wherein the computer readable instructions that upon execution by the one or more computing nodes, at least cause the system to associate a session identifier with the stored notification.

14. The system as recited in claim 8 wherein the communication comprises a subscription to notifications associated with the webclient.

15. A message notification system, comprising:
one or more computing processors that upon execution of computer readable instructions configure the system at least to:
establish a persistent connection to a message server in response to receiving a message that a first HTTP server is servicing a webclient;
receive information from the message server indicative that at least one message has been received addressed to an account associated with the webclient;
store information indicative of a first notification that at least one message has been received based on the received information; and
in response to receiving a communication from the first HTTP server, provide information to the first HTTP server to retrieve the stored first notification; and
in response to receiving a subsequent communication from a second HTTP server, provide information to the second HTTP server to retrieve one or more notifications stored subsequent to the first notification.

16. The system as recited in claim 15, wherein the first notification is stored in a database in the storage location, the first notification stored based on information identifying the webclient.

17. The system as recited in claim 16, wherein the computer readable instructions upon execution further configure the system to cause the notification to be deleted based upon a predetermined event.

18. The system as recited in claim 17, wherein the predetermined event comprises a preset time.

19. The system as recited in claim 15 wherein the computer readable instructions upon execution further configure the system to transmit an acknowledgement of receipt of the notification to the to the message server.

20. The system as recited in claim 15 wherein the computer readable instructions upon execution further configure the system to associate a session identifier with the stored notification.

* * * * *